United States Patent
Steenhoek et al.

(10) Patent No.: US 8,601,781 B2
(45) Date of Patent: Dec. 10, 2013

(54) SYSTEM AND APPARATUS FOR ENABLING RAKING AND BALING MATERIAL IN A SINGLE PASS

(71) Applicant: Pioneer Hi-Bred International, Inc., Johnston, IA (US)

(72) Inventors: Loren Steenhoek, Ankeny, IA (US);
Teddy W Bellamy, Yakima, WA (US);
Marc Harris, Yakima, WA (US);
Michael L Yearout, Selah, WA (US);
David C Rankin, Yakima, WA (US)

(73) Assignee: E I du Pont de Nemours and Company Rankin Equipment Co, Wilmington, DE (US)

( * ) Notice: Subject to any disclaimer, the term of this patent is extended or adjusted under 35 U.S.C. 154(b) by 0 days.

(21) Appl. No.: 13/661,857

(22) Filed: Oct. 26, 2012

(65) Prior Publication Data

US 2013/0104513 A1 May 2, 2013

Related U.S. Application Data

(60) Provisional application No. 61/552,540, filed on Oct. 28, 2011.

(51) Int. Cl.
*A01D 76/00* (2006.01)
*A01D 78/00* (2006.01)
*A01D 80/00* (2006.01)
*A01D 84/00* (2006.01)

(52) U.S. Cl.
USPC ............... 56/375; 56/368; 172/311; 172/387

(58) Field of Classification Search
USPC ............ 56/368, 375, 377, 376, 370; 172/311, 172/387, 456
See application file for complete search history.

(56) References Cited

U.S. PATENT DOCUMENTS

| | | | | |
|---|---|---|---|---|
| 5,155,986 A * | 10/1992 | Kelderman | ...................... | 56/365 |
| 5,337,546 A * | 8/1994 | Sieling | ............................ | 56/365 |
| 5,685,135 A * | 11/1997 | Menichetti | ....................... | 56/365 |
| 6,105,354 A * | 8/2000 | Luhn et al. | ....................... | 56/385 |
| 6,293,352 B1 * | 9/2001 | Hundeby et al. | ............... | 172/456 |
| 6,374,921 B1 * | 4/2002 | Friggstad | ....................... | 172/311 |
| 6,467,249 B2 * | 10/2002 | Demanet | ......................... | 56/377 |
| 6,702,035 B1 * | 3/2004 | Friesen | ........................... | 172/311 |
| 6,834,488 B2 * | 12/2004 | Menichetti | ....................... | 56/378 |
| 7,100,351 B2 * | 9/2006 | Rowse et al. | .................... | 56/377 |
| 7,360,353 B2 * | 4/2008 | Hruska et al. | ................... | 56/377 |

(Continued)

OTHER PUBLICATIONS

Generation 2 Twinstar—Basket Rakes Produce Superior Quality Hay!;Downloaded from www.northstarattachments.com; 4 pages.

(Continued)

*Primary Examiner* — Árpád Fábián-Kovács

(57) ABSTRACT

An adjustable rake assembly for raking and baling material in a single pass is provided. In particular, a rake assembly is provided that includes a frame and two movable wings configured to be moved to at least one transport position, in which the wings are disposed proximate a main axial member of the frame in a folded arrangement. A rake assembly is also provided wherein at least one rake is configured to be moved with respect to the frame between a first position and a second position via a telescoping rake connection and a rotating rake connection. The position of the wings and/or rakes may be changed via a control system.

6 Claims, 15 Drawing Sheets

(56) References Cited

U.S. PATENT DOCUMENTS

| | | | |
|---|---|---|---|
| 7,367,175 B2* | 5/2008 | Scott | 56/341 |
| 7,540,139 B2* | 6/2009 | Rowse et al. | 56/377 |
| 7,562,719 B1* | 7/2009 | Misenhelder et al. | 172/456 |
| 7,712,544 B1* | 5/2010 | Misenhelder et al. | 172/311 |
| 7,740,084 B2* | 6/2010 | Rosenboom | 172/387 |
| 7,877,970 B1 | 2/2011 | Crosby | |
| 8,240,118 B1* | 8/2012 | Johnson | 56/368 |
| 2002/0059790 A1* | 5/2002 | Paulsen | 56/377 |
| 2003/0233820 A1* | 12/2003 | Menichetti | 56/377 |
| 2005/0210856 A1* | 9/2005 | Menichetti | 56/377 |

OTHER PUBLICATIONS

Flexrake—About Flexrake; downloaded from http://www.flexrakellc.com/about.html; on Oct. 22, 2012; 1 page.

Material Agricole; Coalert Essieux System; Hydrok; Andainer et presser sans cailloux; downloaded from http://www.materielagricole.info/andainer-et-presser-sans-cailloux-art . . . On Oct. 26, 2012; 1 page.

Recolte: andainer et presser en un passage avec le Resolution NR90; downloaded from http://www.lafranceagricole.fr/nouveautes-agricoles/recolte-andainer- . . . On Oct. 26, 2012; 3 pages.

Turning Two Jobs Into; 1 page.

* cited by examiner

SYSTEM AND APPARATUS FOR ENABLING RAKING AND BALING MATERIAL IN A SINGLE PASS

CROSS-REFERENCE TO RELATED APPLICATIONS

The present application claims priority from U.S. Provisional Application No. 61/552,540, filed Oct. 28, 2011, which is hereby incorporated herein in its entirety by reference.

FIELD OF THE INVENTION

The present invention relates generally to a system, apparatus, and method for raking and baling material in a single pass.

BACKGROUND

When harvesting grain, a combine harvester (also known simply as a "combine") may be used to separate grain from material-other-than-grain ("MOG"). Harvested grain is typically stored on the combine for subsequent handling, and MOG is typically ejected back onto the crop field.

In some cases, the MOG may be useful as feed for animals or as biofuel, among other things. Thus, once the crop has been harvested and the MOG is left on the field, a rake (e.g., a basket rake) may be moved through the field to rake and windrow the MOG. In the case of corn, for example, stover that is dispersed throughout the field may be raked and placed in windrows on the ground that can later be gathered and formed into bales of the material for subsequent use.

In other cases, crops such as switch grass, miscanthus, sugar cane, or other vegetative crops may be grown for use as biofuel. In such cases, the field may be mowed, raked, and windrowed, and the windrows of material (which, for example, may include the whole plant—both grain and MOG) may be baled for subsequent transport and processing.

In either scenario, raking the material into windrows and subsequently baling the material typically requires a dedicated tractor and operator for each machine, which may add to the expense and duration of the operations. In addition, depending on the size of the field, several passes may be required to address the entire area to be raked and baled.

Accordingly, there is a need in the art for a system, apparatus, and method for combining the raking and baling operations such that the operations may occur during a single pass. In addition, there is a need for an improved mechanism for raking and baling a larger area while minimizing the complexity of transporting the equipment to the field location.

BRIEF DESCRIPTION OF THE DRAWINGS

Figure 1:
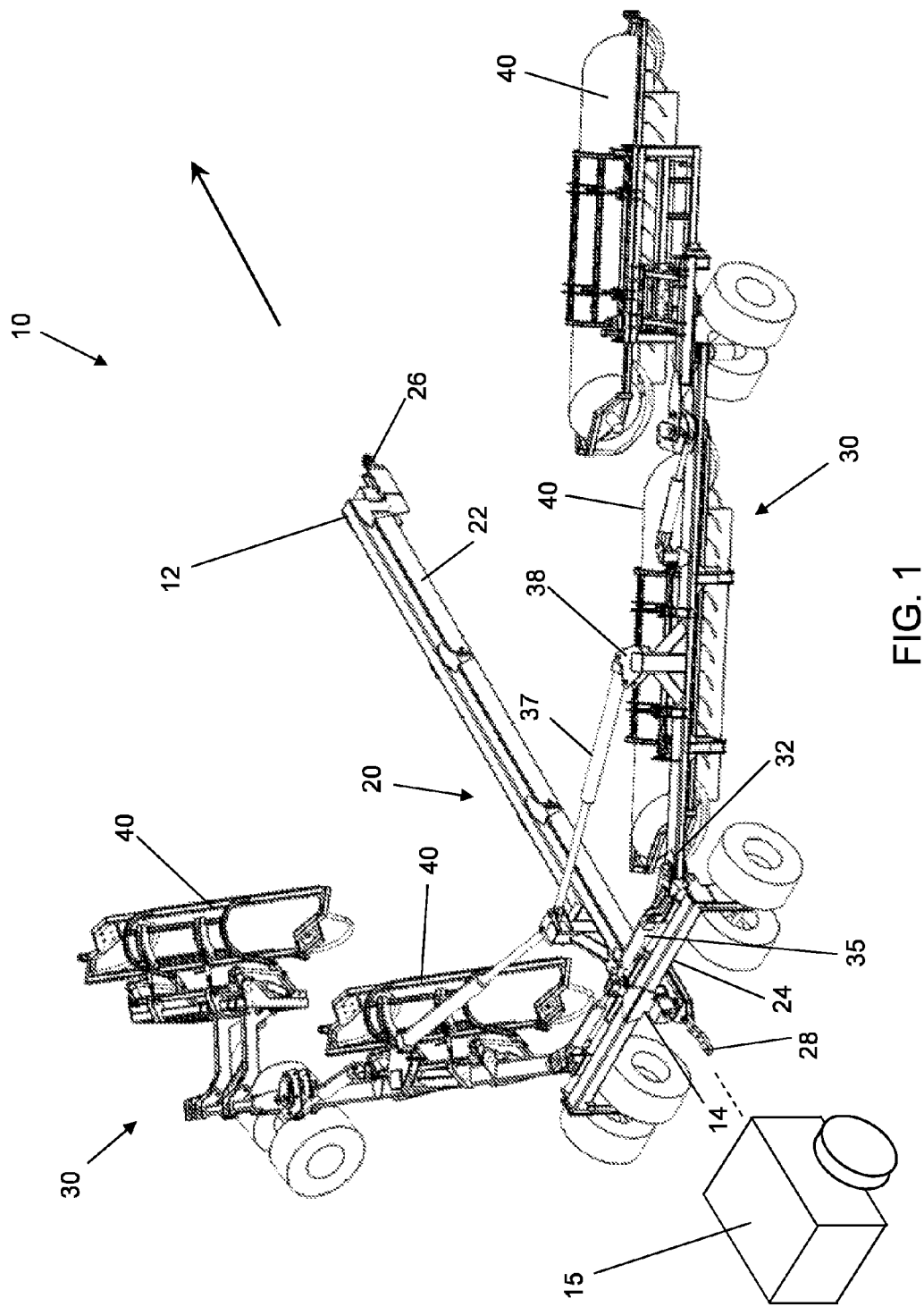
Figure 1A:
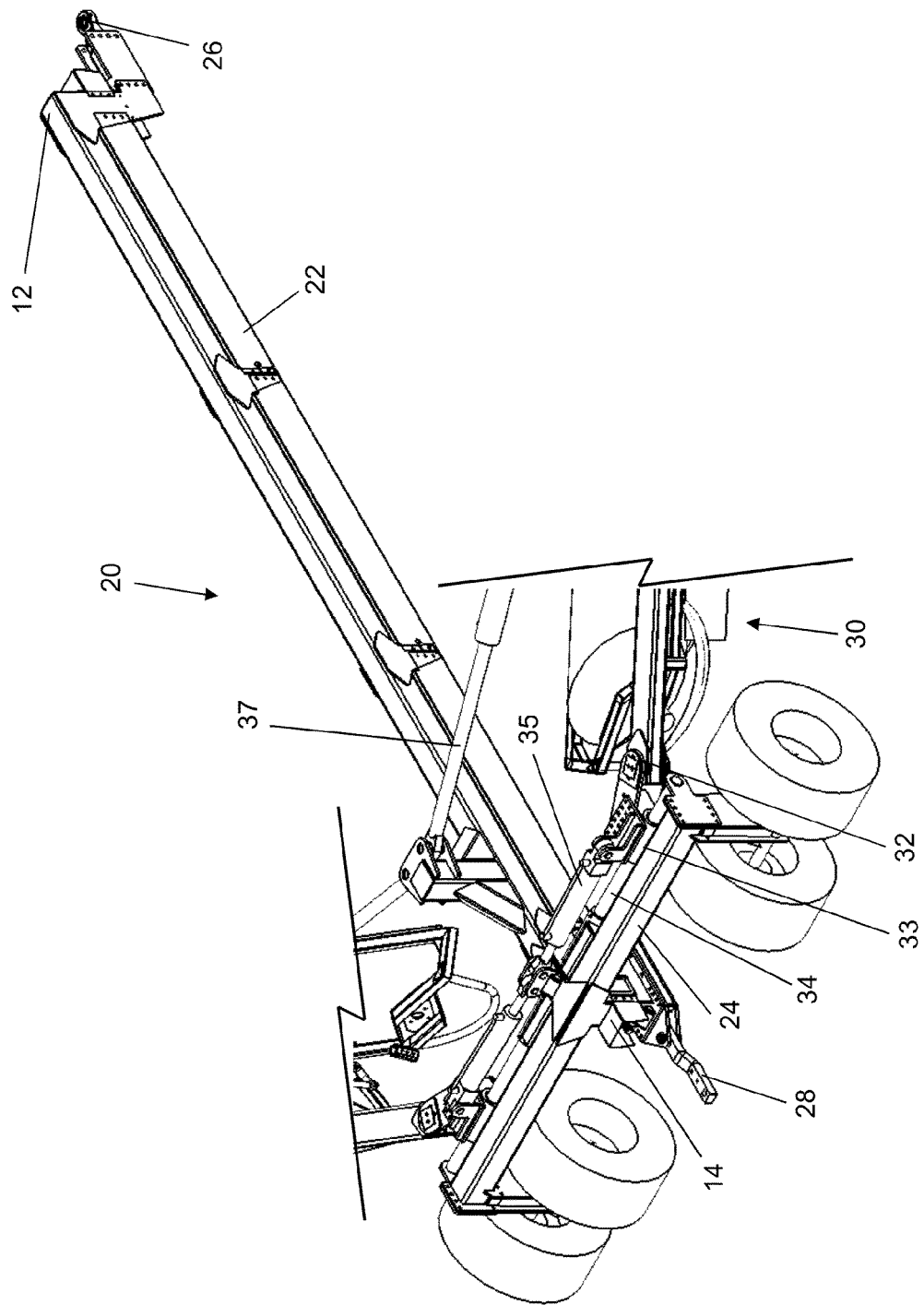
Figure 1B:
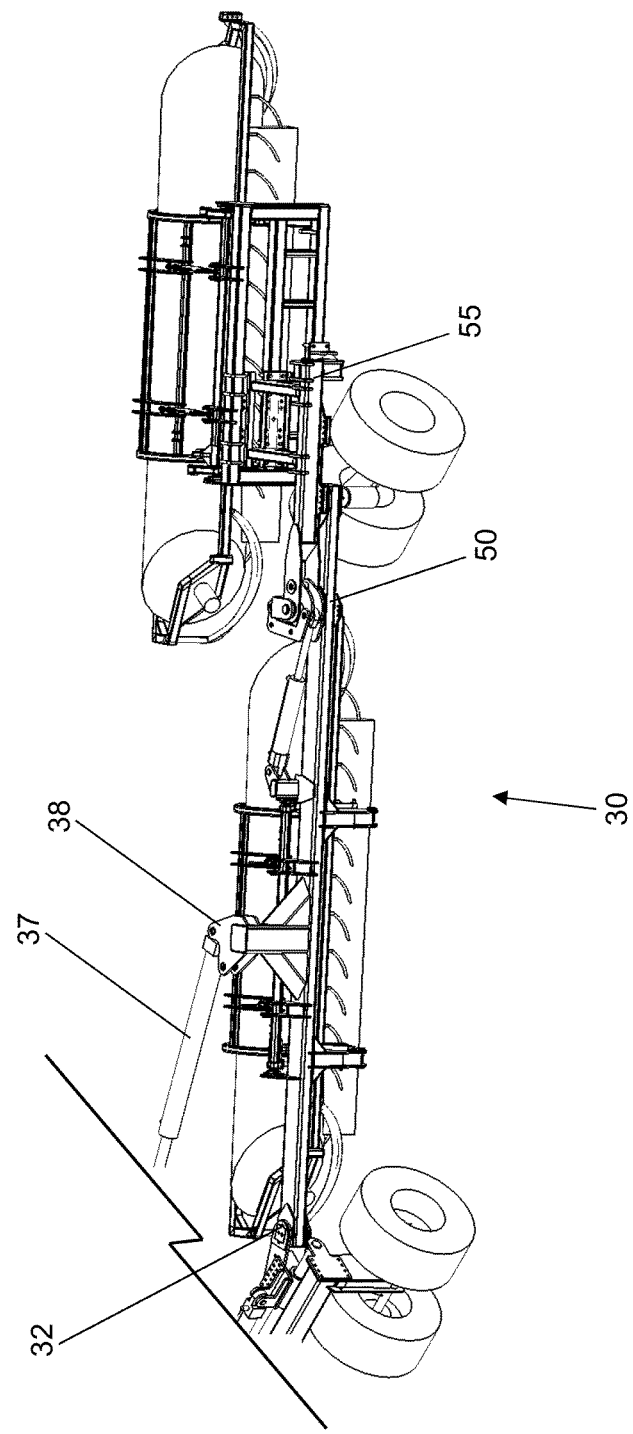
Figure 2:
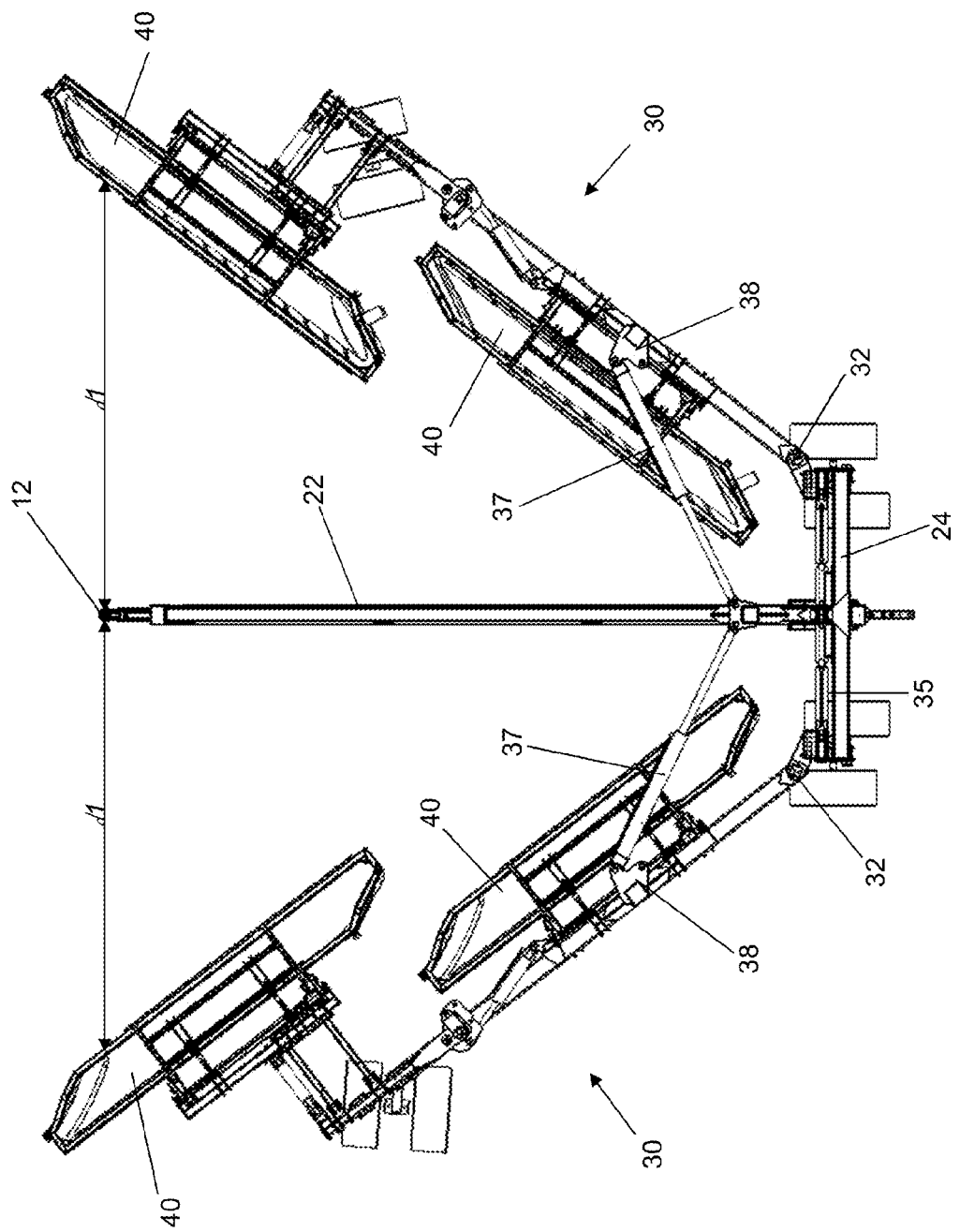
Figure 3:
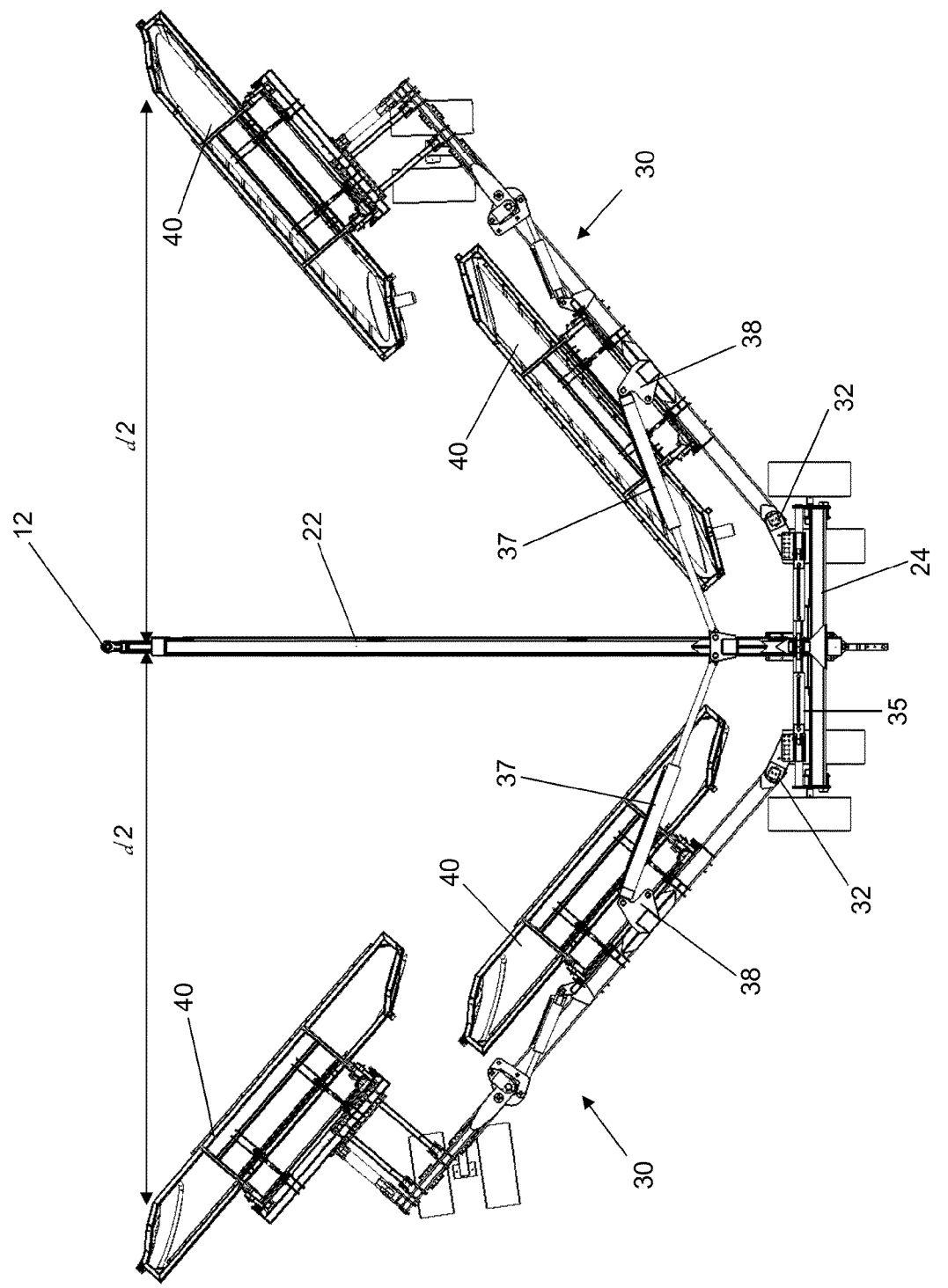
Figure 4:
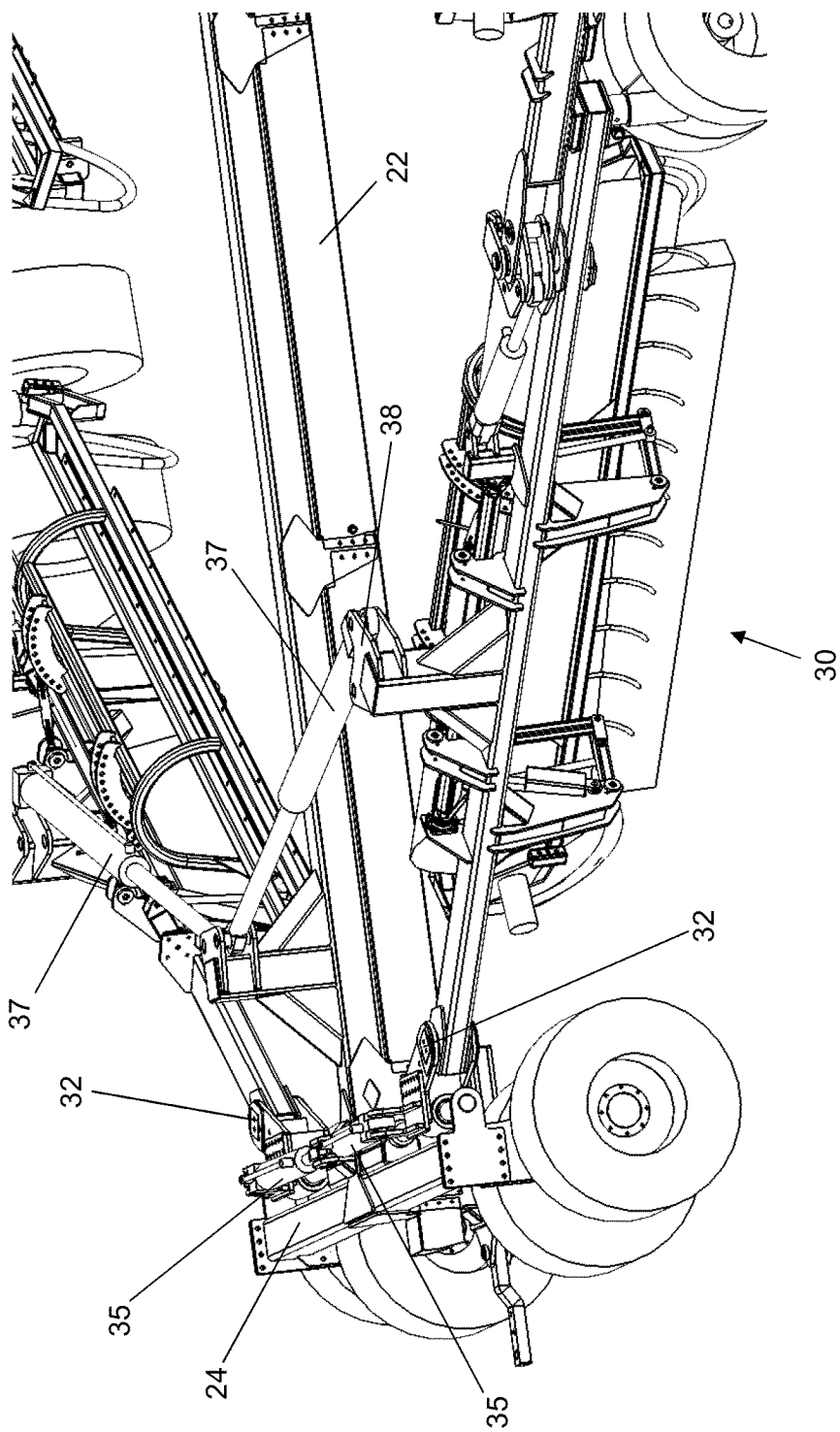
Figure 5:
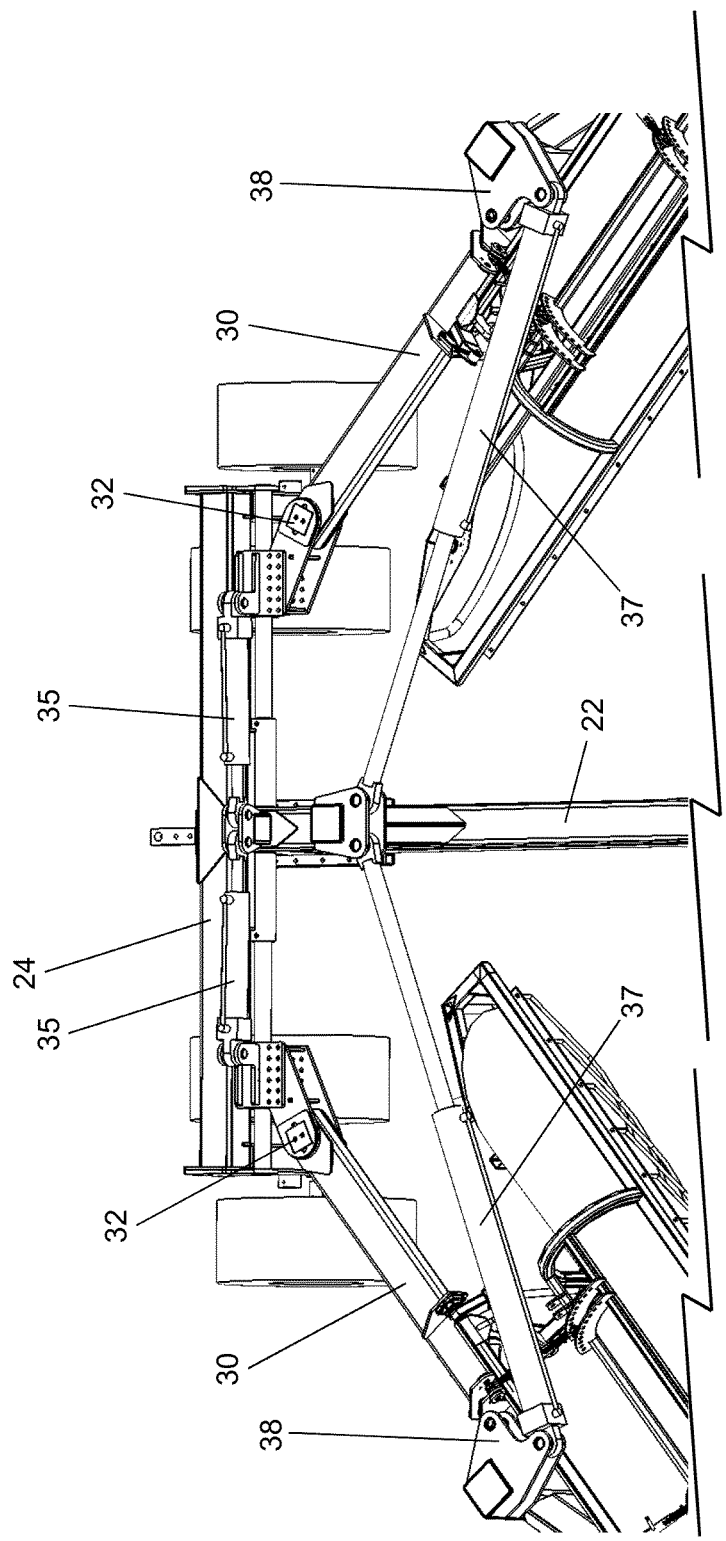
Figure 6:
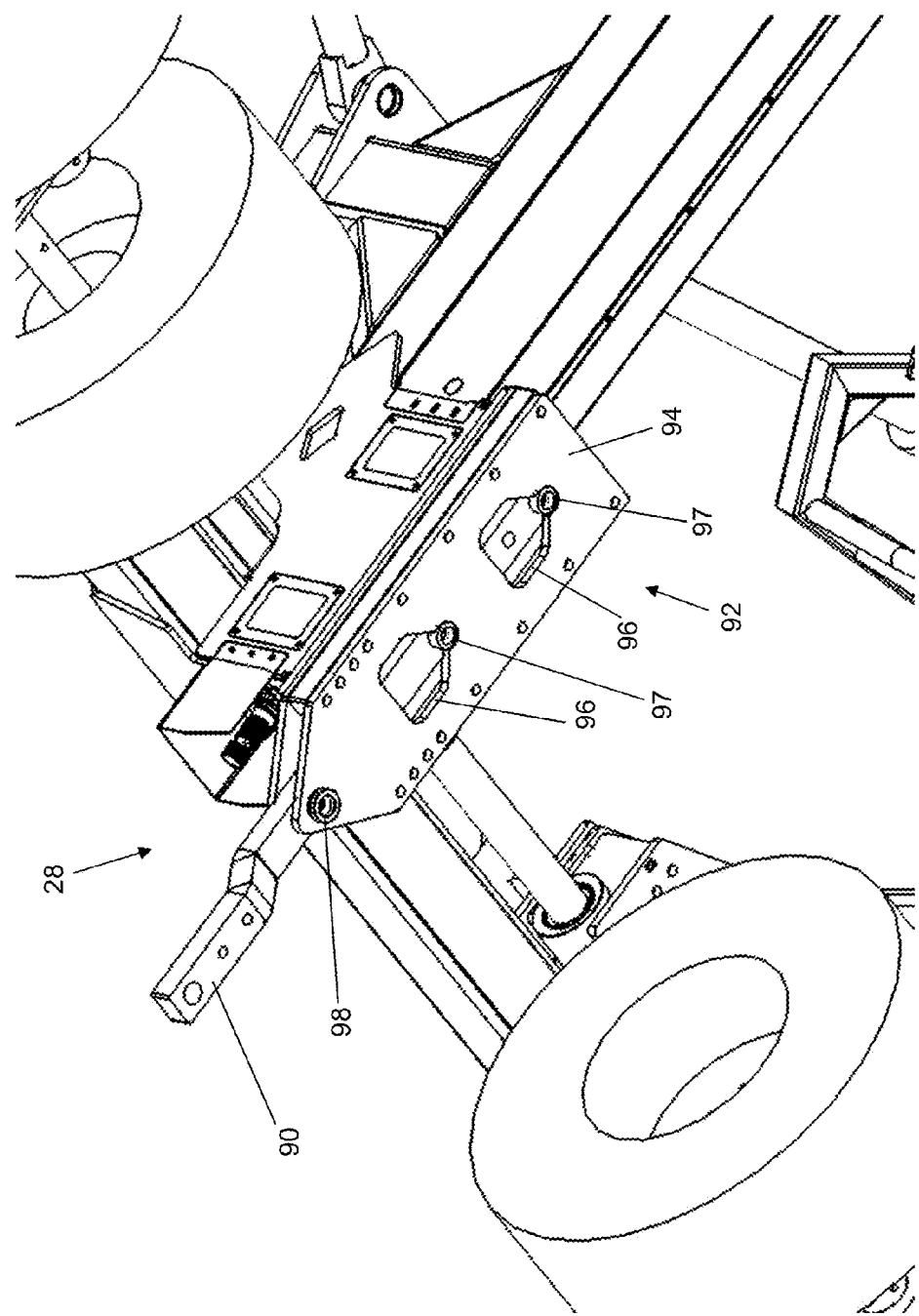
Figure 7:
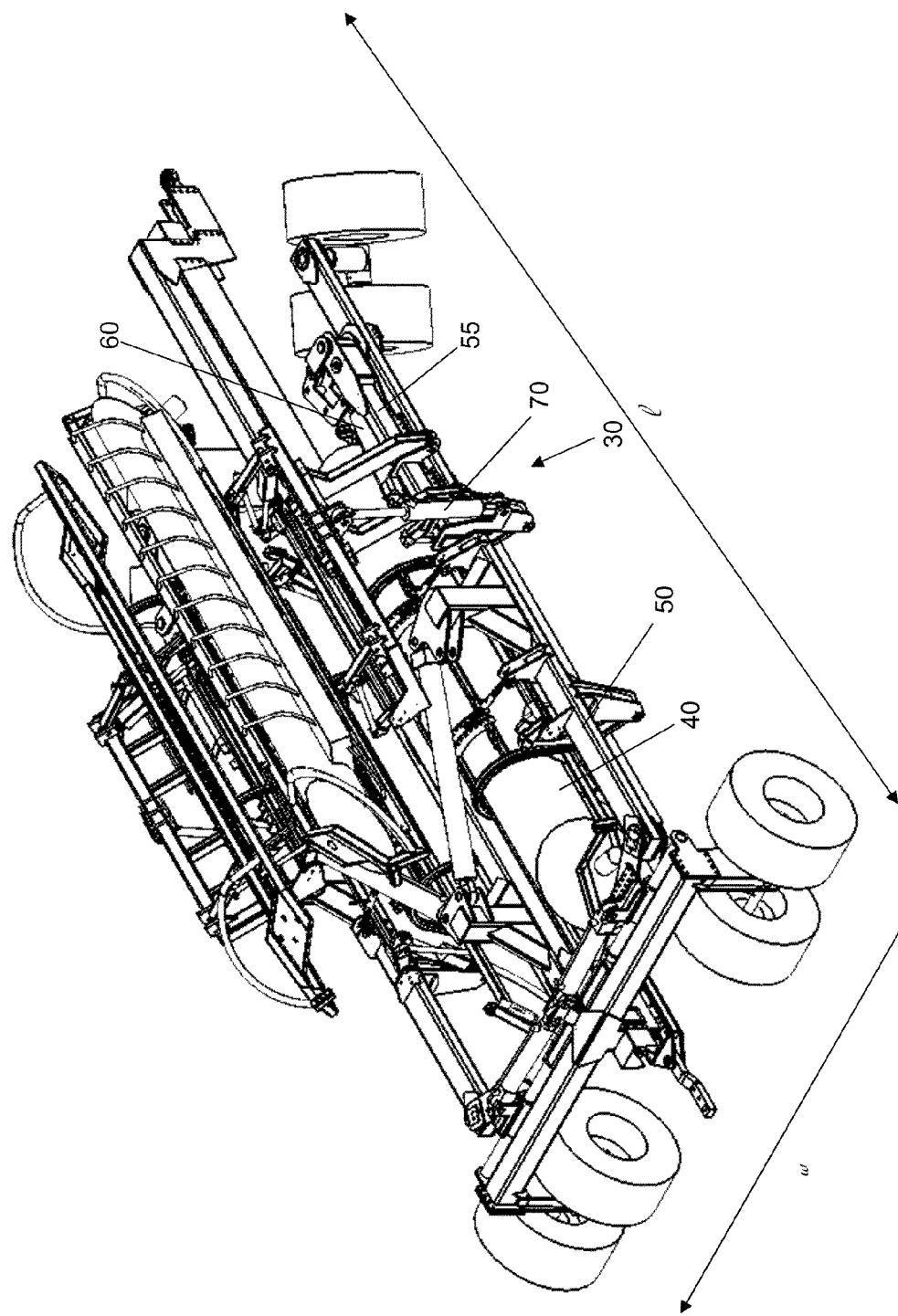
Figure 8:
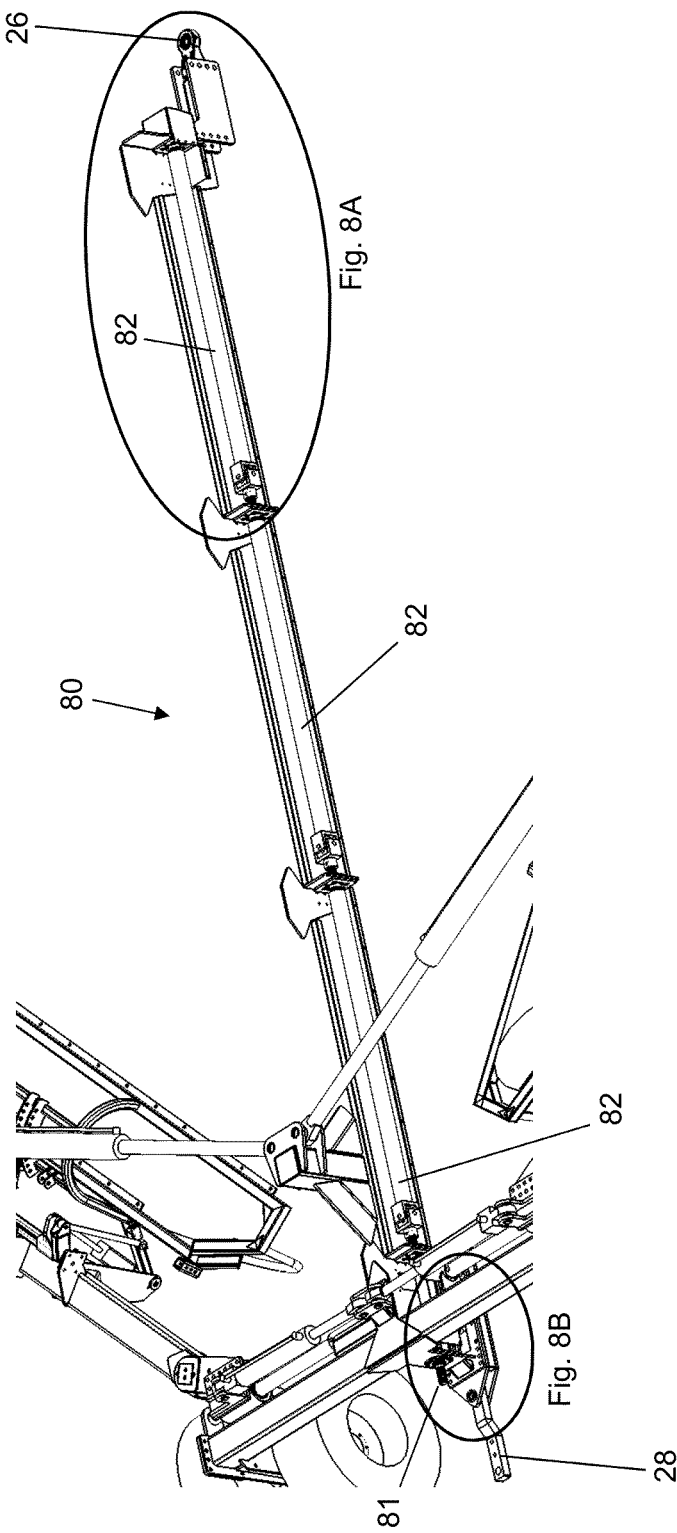
Figure 8A:
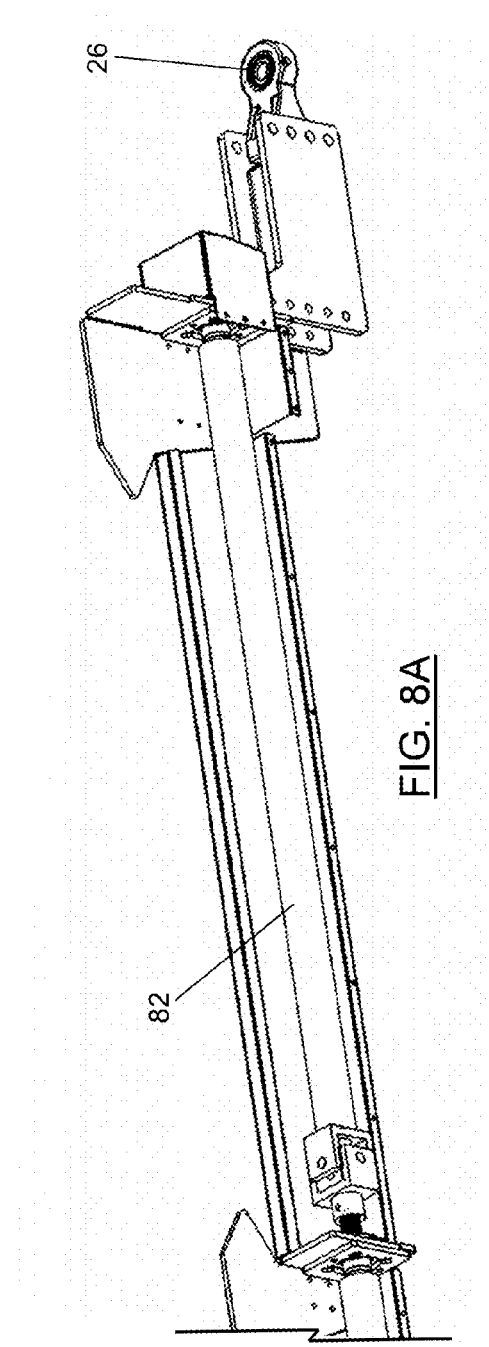
Figure 8B:
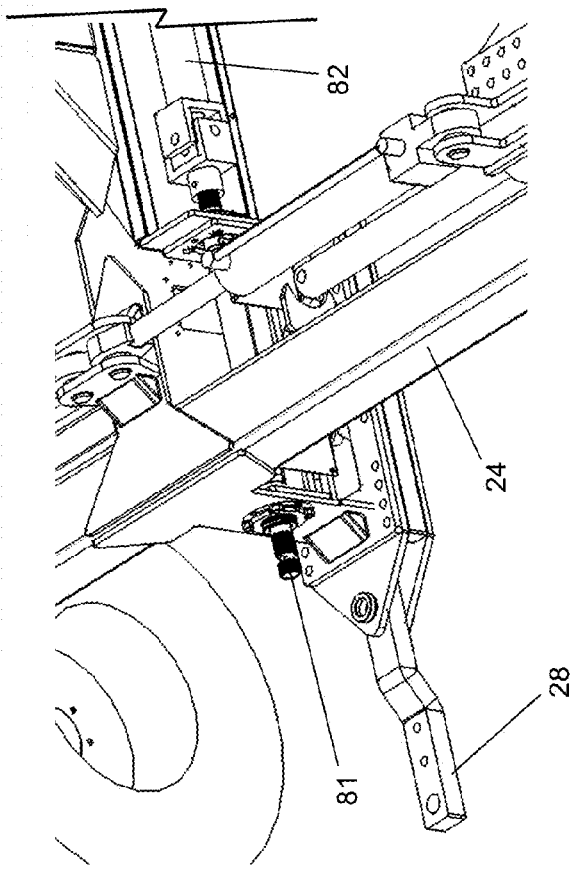
Figure 9:
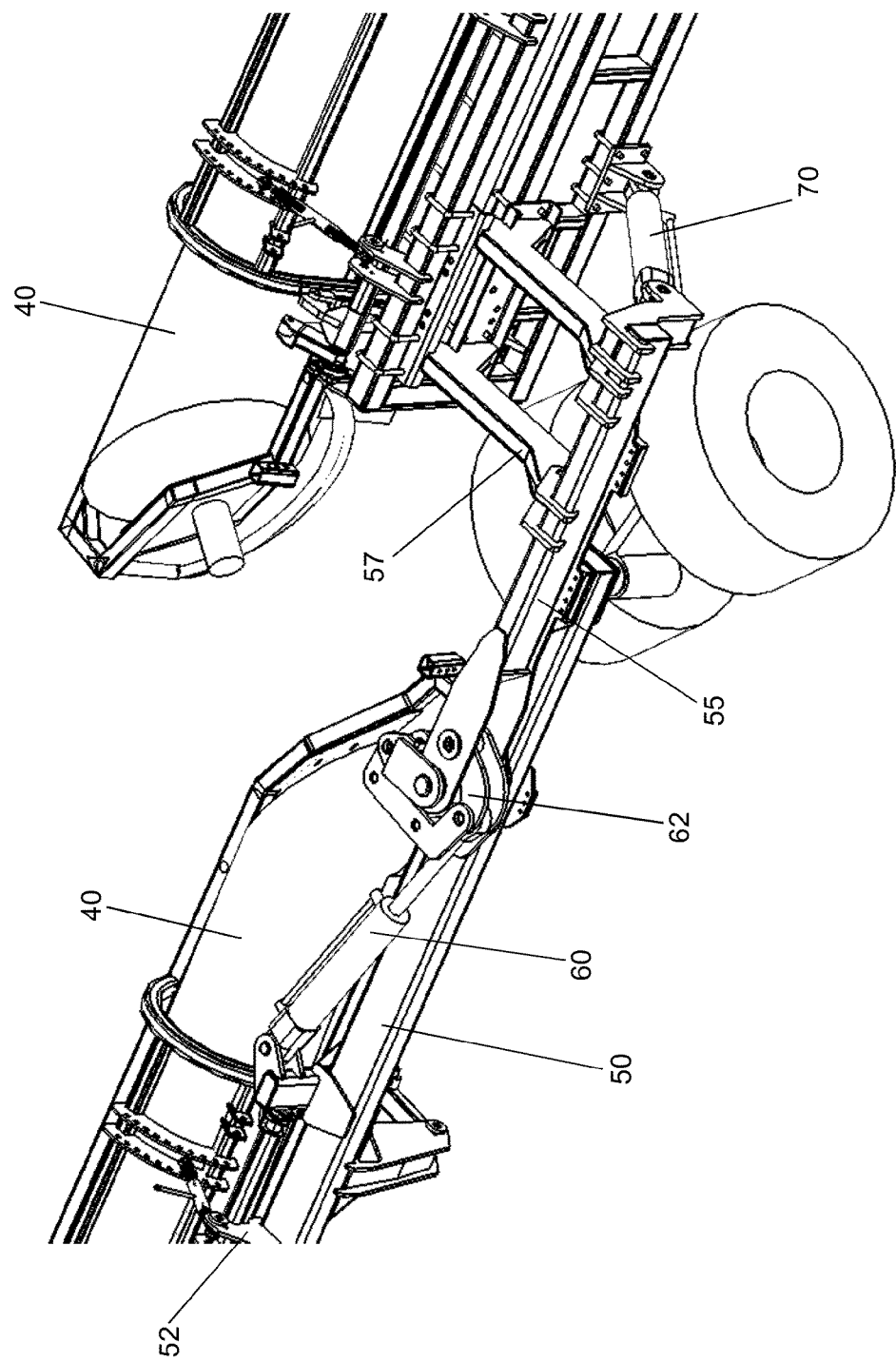
Figure 10:
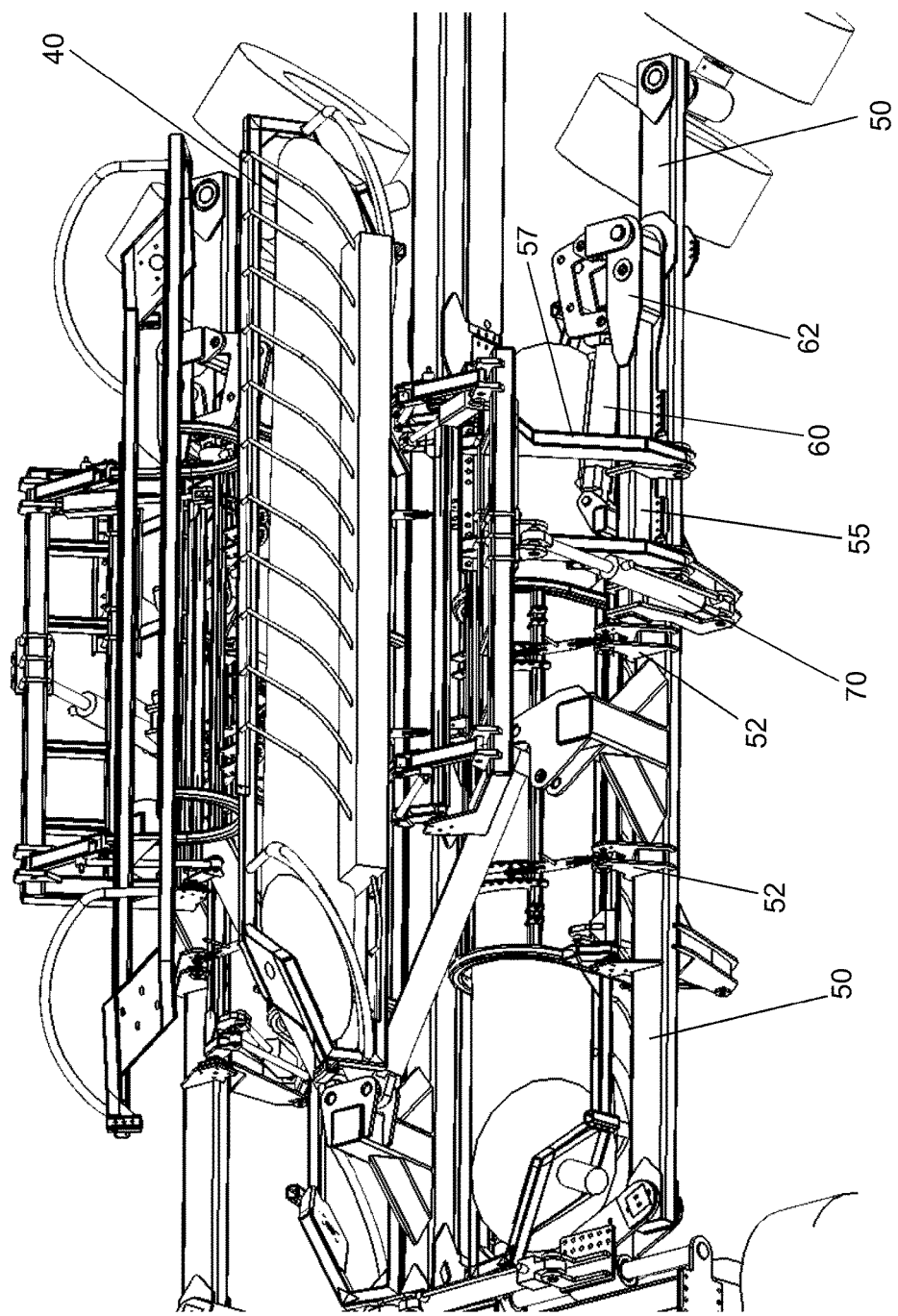
Figure 11:
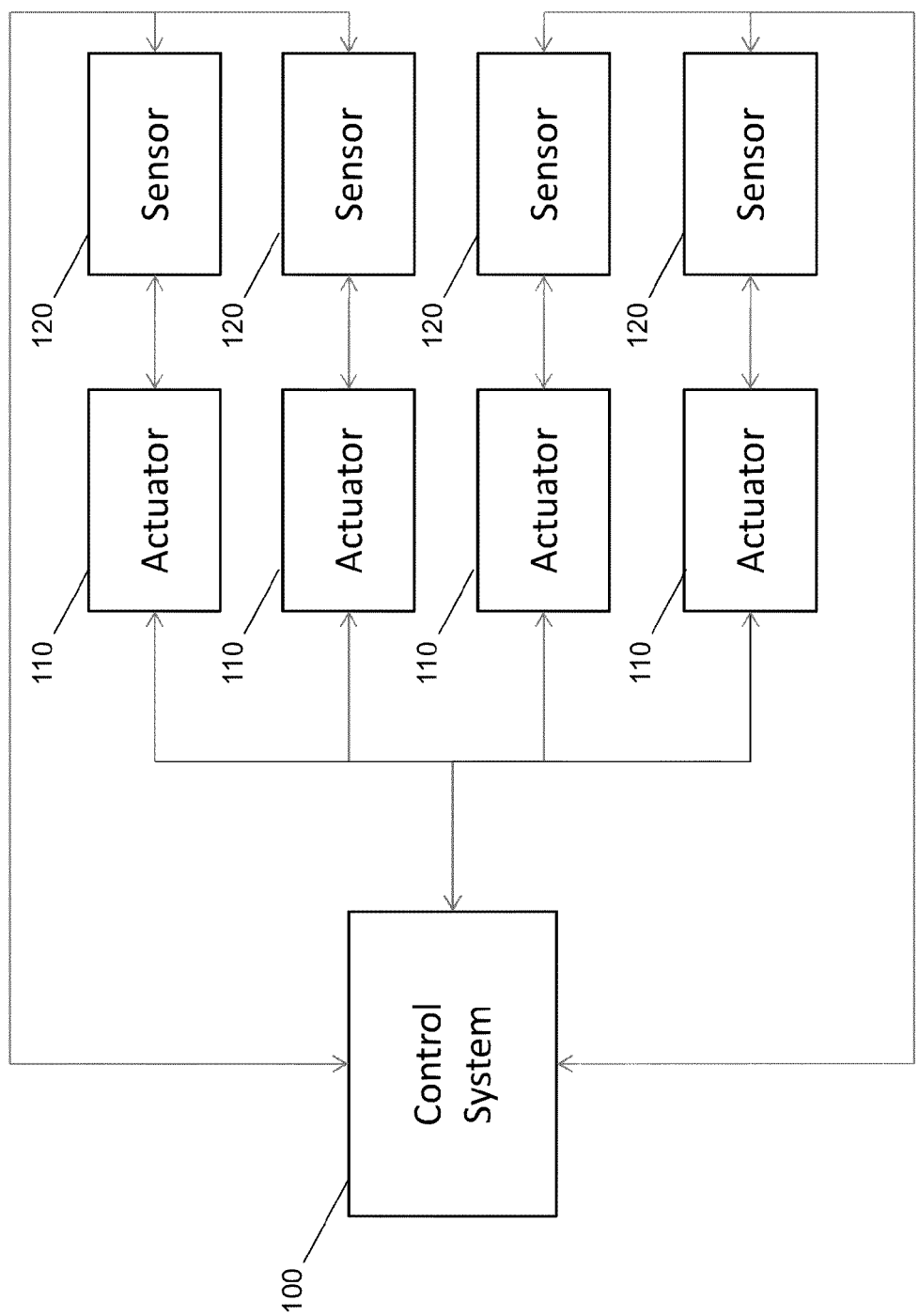
Figure 12:
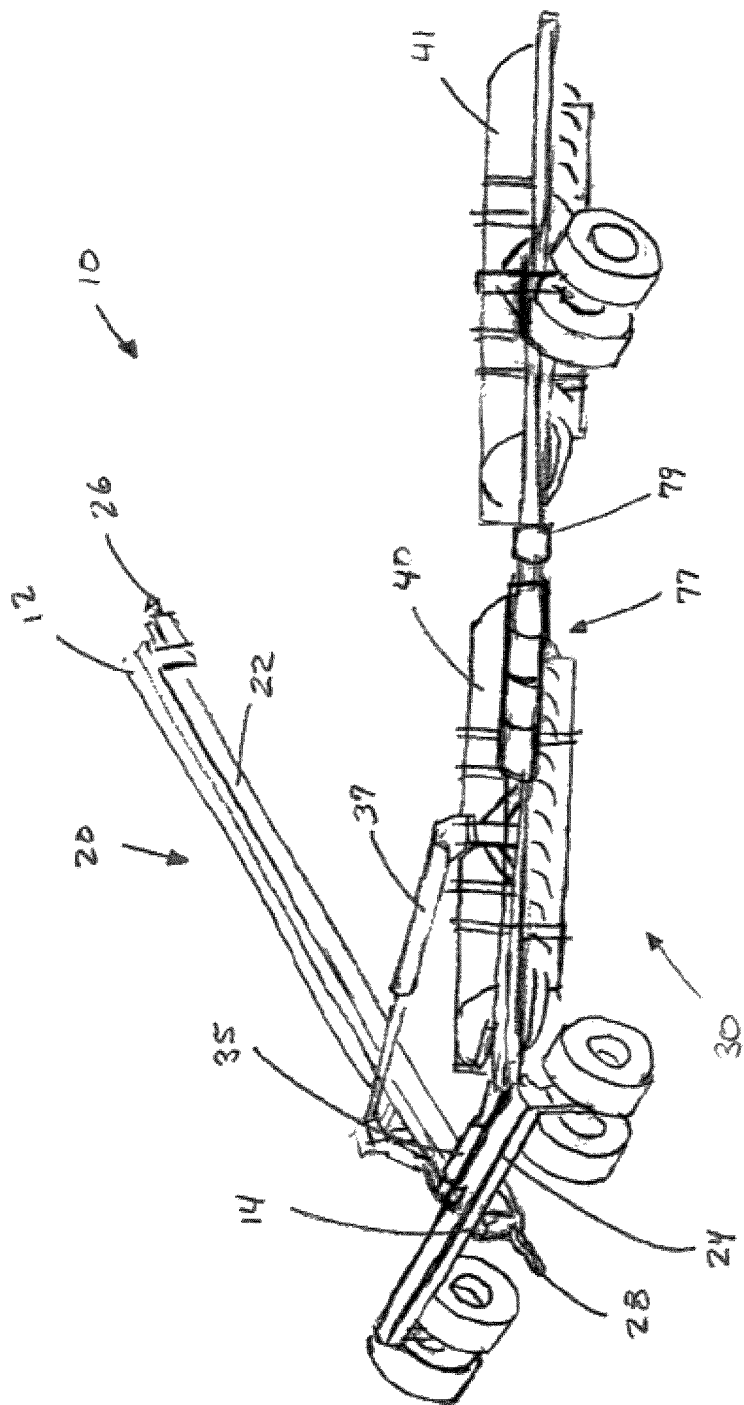

Having thus described the invention in general terms, reference will now be made to the accompanying drawings, which are not necessarily drawn to scale, and wherein:

FIG. 1 shows a perspective view of a rake assembly with wings configured in a field position in accordance with an exemplary embodiment of the present invention;

FIG. 1A shows close-up view of a frame of the rake assembly of FIG. 1;

FIG. 1B shows one of the wings of the rake assembly of FIG. 1 with two rakes attached;

FIG. 2 shows a top view of the rake assembly of FIG. 1 with wings configured in a first position in accordance with an exemplary embodiment of the present invention;

FIG. 3 shows a top view of the rake assembly of FIG. 1 with wings configured in a second position in accordance with an exemplary embodiment of the present invention;

FIG. 4 shows a close-up perspective side view of a back end of the rake assembly in accordance with an exemplary embodiment of the present invention;

FIG. 5 shows a close-up, top view of the rake assembly in accordance with an exemplary embodiment of the present invention;

FIG. 6 shows a close-up, bottom view of the back coupler of the rake assembly in accordance with an exemplary embodiment of the present invention;

FIG. 7 shows a perspective view of a rake assembly in a transport position in accordance with an exemplary embodiment of the present invention;

FIG. 8 shows a perspective view of a main axial member of the rake assembly with portions removed to show a driveline for transmitting power from the tractor to the baler in accordance with an exemplary embodiment of the present invention;

FIG. 8A shows a close-up perspective view of a front portion of the driveline of FIG. 8;

FIG. 8B shows a close-up perspective view of a back portion of the driveline of FIG. 8;

FIG. 9 shows a close-up perspective view of the main wing section and a wing extension of one wing of the rake assembly in accordance with an exemplary embodiment of the present invention;

FIG. 10 shows a close-up perspective view of the rake assembly of FIG. 7 in accordance with an exemplary embodiment of the present invention;

FIG. 11 is a schematic representation of a control system of the rake assembly in accordance with an exemplary embodiment of the present invention; and FIG. 12 shows a perspective view of one side of a rake assembly in accordance with another embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Some components of the rake assembly are not shown in one or more of the figures for clarity and to facilitate explanation of embodiments of the present invention.

As used herein, the terms "material," "crop," "plants," "crop material," "cut material" and similar terms may be used interchangeably to refer generally to the plants that are cut, windrowed, baled, and/or otherwise processed through machines that are moved through the field, including grain and/or MOG. Thus, use of any such terms should not be taken to limit the spirit and scope of embodiments of the present invention. The crop material may include all or parts of various types of plants such as, for example, corn, soybeans, canola, wheat, oat, rye, alfalfa, barley, rice, sunflowers, switch grass, miscanthus, and sugar cane, among other crops, and/or the MOG associated therewith. For example, in the case of sugarcane, fibrous matter known as bagasse that remains after the sugarcane stalks are crushed to extract their juice may be cut, raked, windrowed, and baled for use as a biofuel and as a renewable resource in the manufacture of pulp and paper products and building materials.

In cases in which a crop (such as corn) is first harvested for its grain, a typical combine may be used that is configured to harvest, thresh, and clean the grain that is gathered from a crop field. For example, a header of the combine may be used to gather the grain from the planted crop, with different headers being specifically designed for specific types of crops. The harvested crop material, which may include both grain and MOG, may then proceed to a threshing area of the combine, where a threshing rotor may thresh the crop material against the inside surface of rotor concaves to separate the grain from the MOG.

The MOG typically is released out of the tail end of the rotor and is disposed onto the crop field, while the grain continues through the combine to be cleaned, tested, and/or stored for subsequent processing. Later, a rake (such as a basket rake) may be moved through the harvested field (e.g., pulled by a tractor) to fluff and redistribute the MOG in windrows on the ground in the wake of the rake's passage. The windrowed MOG may then be baled using a separate baler that is also moved through the field (e.g., pulled by another tractor). The baler may pick up the MOG from the ground, compact, form, and tie the MOG into bales, and then deposit the formed bales onto the ground as the baler moves down the field. Thus, in conventional raking and baling operations, two passes must be made using two different pieces of equipment (a rake and a baler) pulled by separately.

Similarly, in a case in which a crop (such as switch grass) is grown solely to be cut and baled for subsequent processing, the plant may be cut and shredded by one piece of machinery, then raked and windrowed onto the field by another piece of machinery, then picked up and baled by another, separate piece of machinery.

In either case, a rake may be used that is configured to rake and fluff the cut material from the field and to discharge the material back onto the field in uniform windrows that are ready for baling by a baler. For example, a piece of equipment such as a Generation2 Twinstar basket rake available from Northstar Attachments, LLC of Yakima, Wash. may be used to rake and windrow the material in preparation for baling.

Accordingly, embodiments of the present invention provide for a system, apparatus, and method for raking and baling material with a single pass of equipment through a field, thus saving time, labor, and cost. In addition, embodiments of the present invention provide a mechanism for raking a wider plot of material and simplifying the transportation of the equipment to and from the field.

With reference to FIGS. 1 and 1A, in general, a rake assembly 10 is provided that includes a frame 20 configured for supporting a pair of adjustable wings 30 that are configured to carry a plurality of rakes 40. The wings 30 are movably attached to the frame and can be moved towards and away from the frame for configuring the rake assembly in a number of positions. The frame 20 may, for example, be configured in a T-shape, as depicted in the figures, with a main axial member 22 defining a front end 12 and a back end 14 of the rake assembly 10, as well as a transverse member 24 fixedly attached to the main axial member proximate the back end.

A front coupler 26 may be provided at the front end 12 of the frame 20 for connecting to a tractor that is designed to pull the rake assembly 10 through a field (e.g., in the direction of the arrow in FIG. 1), and a back coupler 28 may be provided at the back end 14 for connecting to a baler. Each coupler 26, 28 may be any type of coupler that is designed to connect to a corresponding coupler of the adjacent machinery. For example, the front coupler 26 may be designed to engage a tow hitch (e.g., a ball hitch) of the tractor pulling the rake assembly, and the back coupler 28 may be designed to engage a hitch of the baler.

In this regard, the front coupler 26 may include a power take-off (not shown) from the tractor, and the frame 20 may include a driveline 80 for transmitting the power from the tractor to parts of the rake assembly 10, as well as to the baler 15 (e.g., via another power take-off 81 proximate the back coupler 28), as shown in FIG. 8. The driveline 80 may include one or more rotatable shafts 82 connected in series via a U-joint shaft arrangement, which may be at least partially disposed within the main axial member 22 (part of which is removed in FIG. 8). For example, in the depicted embodiment, the driveline 80 includes three rotatable shafts 82 connected in series. Thus, the main axial member 22 may serve as a driveline shield. Power transmitted from the tractor via a power take-off near the front coupler 26 may thus be transferred both to the rake assembly 10 and/or to the baler as necessary via the driveline 80 and the power take-off 81 near the back coupler 28, as well as other rotatable shafts, gears, belts, and/or couplings (which may not be shown in the figures). A close-up view of a rotatable shaft 82 of the driveline 80 near the front coupler 26 is shown in FIG. 8A, and a close-up view of the driveline with the power take-off 81 near the back coupler 28 is shown in FIG. 8B.

Referring to FIG. 6, the back coupler 28 may be configured to allow for easier alignment of the coupler with the corresponding hitch of the baler by providing several degrees of movement and adjustability. For example, the back coupler 28 may comprise a draw bar 90 that is received within a housing 92. A bottom plate 94 of the housing 92 may define one or more guiding slots 96, and the draw bar 90 may include protrusions 97 that are configured to be received within the slots 96. The draw bar 90 may further include at least one hole (not shown) that is configured to align with a corresponding hole 98 of the housing 92, such that when the protrusions 97 of the draw bar 90 are in a hitch position at a forwardmost location within the slots 96 (as shown in FIG. 6), a pin (not shown) may be passed through the hole 98 of the housing and the corresponding hole of the draw bar 90 to hold the draw bar in position with respect to the housing and the rest of the frame of the rake assembly.

Thus, to connect the baler to the back coupler 28, the pin (not shown) is first removed from the hole 98 of the housing 92 to allow the draw bar 90 to be extended from within the housing and adjusted (e.g., to the left or right) to align the draw bar for connection to the hitch of the baler. Left and right adjustment of the draw bar 90 is possible because the protrusions 97 are allowed to float within the opening of the guiding slots 96. Once the baler is connected to the draw bar 90, the baler may be moved toward the rake assembly, and the inner surfaces of the guiding slots 96 can serve to guide the protrusions 97 to the hitch position shown in FIG. 6. At that point, the draw bar 90 is in position to be affixed to the housing 92 via re-insertion of the pin through the hole 98.

With reference to FIGS. 1 and 1B, the frame 20 of the rake assembly may be configured to support two wings 30 (one of which is shown in FIG. 1B) that are movable among different positions to configure the rake assembly 10 for accommodating various widths of plots to be raked, as well as to allow for road transport to and from the field, as described below. Each wing 30 may include multiple points of attachment to the frame 20, where each point of attachment allows for the respective wing to be moved toward and away from the main axial member 22 of the frame 20 and to be maintained in various positions with respect to the main axial member.

For example, each wing 30 may be pivotally connected to the transverse member 24 of the frame 20 via a first linkage 32. In addition to allowing an end of the wing 30 to rotate with respect to the transverse member 24, the first linkage 32 may be slideably fixed to the transverse member, such as via a sleeve 33 that is configured to slide over a rod 34 (also shown in FIG. 1A). A first set of hydraulic cylinders 35 may be provided to move each sleeve 33 over the respective rod 34 to adjust a transverse position of the connected end of the wing 30 with respect to the main axial member 22. In addition, a second set of hydraulic cylinders 37 may be provided, each hydraulic cylinder being pivotally attached to a respective wing 30 via a second linkage 38 at a location that is spaced from the respective linkage 32. Thus, with reference to FIGS. 2 and 3, the wings 30 may be moved between first and second field positions to allow for different spans (e.g., widths) of the field to be raked and baled with each pass of the rake assembly 10.

In FIG. 2, for example, the linkages 32 are disposed at an outermost position (e.g., spaced at a maximum distance from the main axial member 22) via the first hydraulic cylinders 35 and the sleeves 33 (shown in FIG. 1A). The second hydraulic cylinders 37 are also in an extended position, resulting in a distance d1 between the front end 12 of the frame 20 and each of the forwardmost rakes 40. By comparison, in FIG. 3, the linkages 32 are moved in closer to the main axial member 22 via the hydraulic cylinders 35. As a result, the distance d2 between the front end 12 and each of the forwardmost rakes 40, d2, is greater than the distance d1 in FIG. 2. Thus, in FIG. 3, a greater width of the field may be raked and baled in a single pass than, for example, in FIG. 2. Additional views of the first and second linkages 32, 38 and the respective first and second hydraulic cylinders 35 and 37 are shown in FIGS. 4 and 5.

As noted above with reference to FIG. 1, each wing 30 may comprise multiple rakes 40 configured to rake material from the field and form windrows for pick up and baling by a baler (not shown) attached to the back coupler 28 at the back end 14 of the rake assembly 20. For example, in the depicted embodiment, two rakes 40 are attached to each wing 30 in a staggered configuration. Such a staggered configuration, in which the longitudinal axis of each rake is offset (e.g., not aligned) from the other rake on the same wing 30, may optimize the flow of raked material in the direction of the main axial member 22 of the frame 20 for creating windrows that can be picked up and baled more efficiently by the baler.

Turning now to FIG. 7, in some embodiments the wings 30 may be movable from a field position (e.g., the first field position of FIG. 2 or the second field position of FIG. 3) to a transport position, in which the wings and the attached rakes 40 are in a folded configuration and the overall width w of the rake assembly 10 is minimized to allow for road transport of the rake assembly. Actuation of the multiple sets of hydraulic cylinders as described below may, for example, draw the wings 30 in from an extended, field position shown in FIG. 1 to a contracted, transport position in which the forwardmost rakes 40 are raised to a position above the rearwardmost rakes to provide a shorter length l for road transport, as shown in FIG. 7. In addition, the first set of hydraulic cylinders 35 may also be actuated to adjust the width w of the rake assembly 10 further by moving the folded wings 30 closer to the main axial member 22, if necessary.

In this regard, and with reference to FIGS. 1B, 9, and 10, each wing 30 may include a main wing section 50 and a wing extension 55 that are movable with respect to each other. In embodiments including two rakes 40 attached to each wing 30, for example, each rearwardmost rake may be attached to a respective main wing section 50 via one or more first connections 52 (FIG. 10), and each forwardmost rake may be attached to the wing extension 55 via one or more second connections 57 (FIG. 9). In some embodiments, the first connections 52 may be fixed, such that the corresponding rakes are not moveable with respect to the main wing sections 50 to which they are attached. In other embodiments, however, the position of the rake 40 attached to the main wing section 50 may be adjustable with respect to the main wing section (e.g., an angle of tilt, elevation, or distance with respect to the main wing section 50 may be adjustable).

To effect the movement of the forwardmost rakes 40 from the field positions of FIGS. 1-3 to the transport position of FIG. 7, third and fourth sets of hydraulic cylinders 60, 70 and corresponding linkages 65, 75 may be provided. It is noted that some of the rakes 40 are not shown in FIGS. 7, 9, and 10 to allow certain components of the rake assembly to be illustrated for purposes of explanation.

With reference to FIG. 9, the third hydraulic cylinders 60 may be configured to move each wing extension 55 from the extended position (shown in FIGS. 1 and 9) to a retracted position (shown in FIG. 10) via linkages 62. The linkages 62 may thus be configured to rotate (e.g., about 180°) to move the wings 30 from the position shown in FIG. 9 to the position shown in FIG. 10. In addition, the fourth hydraulic cylinders 70, which may form part of the second connections 57 described above, may be extended to raise the forwardmost rakes 40 to a position that is disposed farther from the ground (e.g., higher up) than the rearwardmost rakes 40. Thus, the second connections 57 may include hinge connections proximate their attachment points to the wing extensions 55. In other words, as the fourth hydraulic cylinders 70 are extended, the second connections 57 may be moved from the relatively horizontal position shown in FIG. 9 to the relatively vertical position shown in FIG. 10 (e.g., via rotation about the hinge connections of about 110°).

Referring to FIG. 1, once the third and fourth hydraulic cylinders 60, 70 have been actuated to translate the respective forwardmost rake rearwardly (e.g., toward the back end 14 of the frame 20 shown in FIG. 1) and, at the same time, raise the rake to a position above the rearwardmost rake, the second hydraulic cylinders 37 may be actuated to move the folded wings 30 closer to the main axial member 20 to achieve the transport position. Thus, actuation of the first, second, third, and/or fourth hydraulic cylinders 35, 37, 60, 70 together may serve to move the rake assembly from the expanded field position of FIG. 1 to the compact transport position of FIG. 7.

In some embodiments, a control system 100 (illustrated in FIG. 11) may be provided to allow an operator to actuate selected hydraulic cylinders (e.g., via actuators 110 shown in FIG. 11) to move the wings 30 and wing components (e.g., the main wing sections 50 and the wing extensions 55) to various positions to achieve a desired configuration of the rake assembly. For example, the control system may be used to move the rake assembly 10 from a field position (e.g., shown in FIGS. 1, 2, and 3) to a transport position (FIG. 7) to allow for easier transportation of the equipment to a field to be raked. The operator may also use the control system to expand the wings 30 to one of several possible field positions for conducting a raking and baling operation, such as one of the first field position (FIG. 2) and the second field position (FIG. 3) or a position therebetween.

Moreover, one or more position sensors 120 (shown in FIG. 11) may be provided to detect the position of the hydraulic cylinders and/or the associated linkages in each configuration of the rake assembly 10, such that the detected positions may be used as inputs to the control system in subsequent operations to re-configure the rake assembly to a position that was found to be desirable or produced optimal results in a past raking operation. For example, the operator, upon conducting a raking and baling operation, may decide that the configuration of the rake assembly 10 used for that particular operation produced excellent results for the particular field (e.g., provided good field coverage or completed the operation in an optimal number of passes). The operator may then interact with the control system to record the particular configuration of the rake assembly, such as by storing the particular positions detected by the position sensors for that specific raking and baling operation in a memory of the control system or a memory in communication with the control system. The settings may be associated with an identifier for later reference, such as a date, the name of the operator, or the name of the field that was raked and baled.

The operator may then change the configuration of the rake assembly from the position or settings used to perform the raking and baling operation to another configuration, such as by using the control system to configure the rake assembly for transport. However, upon later returning to the field for another raking and baling operation (such as during the following crop harvest), the operator may find the original position settings that were recorded and may use these settings as inputs to the control system, such that the previous configuration of the rake assembly that was found to be desirable may automatically be replicated for repeat performance.

A schematic illustration of the control system 100, hydraulic system actuators 110, and position sensors 120 is provided in FIG. 11. In some cases, the control system 100 may include or be embodied by a processor, such as a micro-controller. The control system 100 may be located at the rake assembly or may be remote from the rake assembly, such as when the control system is part of a control panel that is on board the tractor pulling the rake assembly or located elsewhere. In cases where the control system is remotely located, the control system may be in communication with the position sensors and/or the hydraulic system actuators via a wireless network, such as the Internet.

As noted above the structures and components depicted in the figures have been simplified for clarity and ease of explanation. As such, some of the rakes, fasteners, hinge pins, connectors, cables, sensors, etc., although described above, may not be shown in the figures.

FIG. 12 shows a perspective view of a rake assembly 10 in accordance with another embodiment of the present invention. For clarity sake only one side of the rake assembly 10 is shown in the figure; however, it is understood that in practice the rake assembly 10 of FIG. 12 would include two sides. As with the embodiments described above, rake assembly 10 of the depicted embodiment includes a frame 20 configured for supporting a pair of adjustable wings 30 that are configured to carry a plurality of rakes 40, 41. The wings 30 are movably attached to the frame and can be moved towards and away from the frame for configuring the rake assembly in a number of positions. The frame 20 may, for example, be configured in a T-shape, as depicted in the figures, with a main axial member 22 defining a front end 12 and a back end 14 of the rake assembly 10, as well as a transverse member 24 fixedly attached to the main axial member 22 proximate the back end 14.

A front coupler 26 may be provided at the front end 12 of the frame 20 for connecting to a tractor that is designed to pull the rake assembly 10 through a field, and a back coupler 28 may be provided at the back end 14 for connecting to a baler. Each coupler 26, 28 may be any type of coupler that is designed to connect to a corresponding coupler of the adjacent machinery. For example, the front coupler 26 may be designed to engage a tow hitch (e.g., a ball hitch) of the tractor pulling the rake assembly, and the back coupler 28 may be designed to engage a hitch of the baler.

In this regard, as noted above the front coupler 26 may include a power take-off (not shown) from the tractor, and the frame 20 may include a driveline for transmitting the power from the tractor to parts of the rake assembly 10, as well as to the baler (e.g., via another power take-off proximate the back coupler 28).

The frame 20 of the rake assembly 10 of the depicted embodiment may be configured to support two wings 30 (one of which is shown in FIG. 12) that are movable among different positions to configure the rake assembly 10 for accommodating various widths of plots to be raked, as well as to allow for road transport to and from the field, as described below. Each wing 30 may include multiple points of attachment to the frame 20, where each point of attachment allows for the respective wing to be moved toward and away from the main axial member 22 of the frame 20 and to be maintained in various positions with respect to the main axial member.

In the depicted embodiment, for example, each wing 30 may be pivotally connected to the transverse member 24 of the frame 20 via a first linkage 32, thus allowing the wing 30 to rotate with respect to the transverse member 24. A first set of hydraulic cylinders 35 may be provided to adjust a transverse position of the connected end of the wing 30 with respect to the main axial member 22. In addition, a second set of hydraulic cylinders 37 may be provided, each hydraulic cylinder being pivotally attached to a respective wing 30 via a second linkage 38 at a location that is spaced from the respective linkage 32. Thus, the wings 30 may be moved between first and second field positions to allow for different spans (e.g., widths) of the field to be raked and baled with each pass of the rake assembly 10.

In the depicted embodiment, a first rake 40 and a second rake 41 may be located on the wing 30. In various embodiments, the second rake 41 may be located rearwardly from the first rake 40 and on a frame member that is configured to move and/or be adjustable in an axial direction via a telescoping rake connection 77. In addition, in the depicted embodiment the portion of the wing 30 that carries the second rake 41 may be rotatable about a rotating rake connection 79 (which in some embodiments may extend a length behind the second rake 41) such that, for transport, the second rake 41 may be rotated upward about an axis parallel to the supporting frame member. As such, in the depicted embodiment a transport position may be created by rotating the second rake 41 upward from a position where the plane of the second rake 41 is perpendicular to the ground to a position where the plane of the second rake 41 is parallel to ground; retracting the second rake along the telescoping rake connection 77 so that the second rake 41 nests with the first rake 40 and is located above the first rake 40; and rotating the portion of the wings 30 carrying the first rake 40 (and now second rake 41) inward from an extended, field position, toward the main axial member 22.

It should further be noted that in still other embodiments, both the first and second rakes 40, 41 may connect to the frame 20 via a telescoping connection and/or a rotating connection.

Thus, as described above and depicted in the figures, embodiments of the present invention provide a rake assembly having an increased swath (e.g., via a raking swath of up to over 50 ft.) using a four-basket design, which allows for larger fields to be raked using fewer passes of the rake. At the same time, embodiments of the rake assembly have a frame geometry that allows the rake to be placed in a compact transport arrangement, making the rake assembly easier to move to and between fields. In addition, embodiments of the present invention also allow the rake to be used alone or to be coupled to a baler in series by providing a driveline that is capable of transferring power from the tractor to the baler using the structural members of the rake. The robustness and structural integrity of the frame is such that the additional load of pulling a baler behind the rake is supportable when the rake and baler are used in series pulled by a single tractor.

In addition, many modifications and other embodiments of the invention will come to mind to one skilled in the art to which this invention pertains having the benefit of the teachings presented in the foregoing descriptions and the associated drawings. For example, although only some of the configurations of the rake assembly (field positions and transport positions) are shown, numerous other configurations may be possible to accommodate different crops, field conditions, and/or transport conditions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An adjustable rake assembly comprising:
 a frame comprising a main axial member defining a front end and a back end and a transverse member fixedly attached to the main axial member proximate the back end; and
 two wings movably attached to opposed ends of the transverse member, wherein each wing comprises at least two rakes attached thereto,
 wherein each wing is further configured to be moved to at least one transport position, in which the wings are disposed proximate the main axial member in a folded arrangement,
 the adjustable rake assembly further comprising:
 a driveline at least partially disposed with the main axial member that is configured to transmit power from a tractor connected to the rake assembly at the front end of the main axial member to a baler connected to the rake assembly at the back end of the main axial member;
 a plurality of position sensors configured to detect a position of the first and second sets of hydraulic cylinders; and
 a control system configured to actuate at least one of the first or second set of hydraulic cylinders based on data received from the position sensors, wherein each wing is configured to be moved with respect to the frame between at least a first field position and a second field position, in which the wings are spaced away from the main axial member for raking operations.

2. The adjustable rake assembly of claim 1, wherein the at least two rakes of each wing are attached to in a staggered configuration.

3. The adjustable rake assembly of claim 1, further comprising a first set of hydraulic cylinders and corresponding linkages pivotally connecting the transverse member of the frame to an end of each wing.

4. The adjustable rake assembly of claim 3, a second set of hydraulic cylinders and corresponding linkages pivotally connecting the main axial member of the frame to a location of each wing spaced from the respective pivotally connected end.

5. The adjustable rake assembly of claim 1, wherein the desired first position of the wings with respect to the frame of the adjustable rake may be achieved via the control system, wherein the first position of the wings may be changed to the second position via the control system, and wherein the wings may be returned to the first position via the control system based on position data from the position sensors regarding the first position.

6. The adjustable rake assembly of claim 1, wherein the wings may be moved from a field position to a transport position, in which the wings and the attached rakes are in a folded configuration and the overall width of the rake assembly is minimized to allow for road transportation of the rake assembly.

* * * * *